(12) United States Patent
Muir, III

(10) Patent No.: US 12,121,168 B2
(45) Date of Patent: Oct. 22, 2024

(54) ANTI-SPILL DISPOSABLE DRINK THROUGH CUP LID

(71) Applicant: Brockett Muir, III, Charlottesville, VA (US)

(72) Inventor: Brockett Muir, III, Charlottesville, VA (US)

( * ) Notice: Subject to any disclaimer, the term of this patent is extended or adjusted under 35 U.S.C. 154(b) by 951 days.

(21) Appl. No.: 16/686,821

(22) Filed: Nov. 18, 2019

(65) Prior Publication Data
US 2020/0093301 A1    Mar. 26, 2020

Related U.S. Application Data

(63) Continuation-in-part of application No. 15/345,010, filed on Nov. 7, 2016, now Pat. No. 10,477,996, which is a continuation-in-part of application No. 13/368,654, filed on Feb. 8, 2012, now abandoned.

(51) Int. Cl.
| | |
|---|---|
| *A47G 21/18* | (2006.01) |
| *A47G 19/22* | (2006.01) |
| *B65D 43/02* | (2006.01) |
| *B65D 51/24* | (2006.01) |

(52) U.S. Cl.
CPC ......... *A47G 19/2272* (2013.01); *A47G 21/18* (2013.01); *B65D 43/0202* (2013.01); *B65D 51/245* (2013.01); *B65D 2231/022* (2013.01); *B65D 2543/00046* (2013.01); *B65D 2543/00092* (2013.01); *B65D 2543/00296* (2013.01)

(58) Field of Classification Search
CPC ............ A47G 19/2211; A47G 19/2272; A47G 19/2227; A47G 21/18; B65D 43/02; B65D 47/06; B65D 47/32; B65D 51/245; B65D 2543/00027; B65D 2543/00046; B65D 43/0212; B65D 2231/022; Y02W 30/807
USPC ......................................................... 220/713
See application file for complete search history.

(56) References Cited

U.S. PATENT DOCUMENTS

| | | | |
|---|---|---|---|
| 3,048,317 A | 8/1962 | Cochrane | 229/103.1 |
| 3,384,265 A | 5/1968 | Frank | 206/508 |
| 4,441,640 A | 4/1984 | Lottick | 224/148.2 |
| 4,589,569 A | 5/1986 | Clements | 220/380 |
| 4,767,019 A | 8/1988 | Horner | 220/713 |
| 5,381,924 A | 1/1995 | Kiefel | 220/709 |
| 5,409,131 A | 4/1995 | Phillips | 220/717 |
| 6,220,476 B1 | 4/2001 | Waller | 220/719 |
| 6,296,141 B1 | 10/2001 | Lukacevic | 220/713 |
| 6,305,571 B1 | 10/2001 | Chu | 220/719 |
| 6,644,490 B2 | 11/2003 | Clarke | 220/254.1 |
| 6,679,397 B2 | 1/2004 | Smith | 220/254.1 |
| 6,948,633 B2 | 9/2005 | Freek | 220/711 |
| 7,246,716 B2 | 7/2007 | Durdon | 220/254.3 |

(Continued)

*Primary Examiner* — Anthony D Stashick
*Assistant Examiner* — L Kmet
(74) *Attorney, Agent, or Firm* — Niro McAndrews, LLP

(57) ABSTRACT

This invention relates to anti-spill disposable and reusable drink-through lids for hot and cold disposable and reusable beverage cups. The present invention is directed to drink-through lids which may be placed over and attached to disposable and reusable beverage cups and which provides a drink-through opening near the perimeter of the lid's top surface for easy drinking. The drink-though lid can accommodate a consumer's lips or a beverage disposable or reusable straw. When used with a straw, the lid and straw combination creates a spill-proof seal.

20 Claims, 8 Drawing Sheets

(56) References Cited

U.S. PATENT DOCUMENTS

| | | | |
|---|---|---|---|
| 7,591,393 B2 | 9/2009 | Crudgington | 220/713 |
| 8,033,420 B2 | 10/2011 | Roseblade | 220/731 |
| 9,051,089 B2 * | 6/2015 | Jochem | B65D 43/0208 |
| 2002/0027139 A1 | 3/2002 | O'neill | 220/254.1 |
| 2002/0074337 A1 | 6/2002 | Melton | 220/713 |
| 2003/0089714 A1 | 5/2003 | Dart | 220/254.3 |
| 2006/0071008 A1 | 4/2006 | Sadlier | 220/713 |
| 2006/0201945 A1 | 9/2006 | Tedford | 220/254.9 |
| 2007/0012698 A1 | 1/2007 | Durdon | 220/253 |
| 2007/0012709 A1 | 1/2007 | Durdon | 220/791 |
| 2007/0023442 A1 | 2/2007 | Auzenne | 220/801 |
| 2007/0034629 A1 | 2/2007 | Mazzarolo | 220/254.3 |
| 2007/0075081 A1 | 4/2007 | Stokes | 220/212 |
| 2007/0131692 A1 | 6/2007 | Smith | 220/254.7 |
| 2008/0035652 A1 | 2/2008 | Lusareta | 220/713 |
| 2009/0050641 A1 | 2/2009 | Ivey | 220/713 |
| 2009/0065518 A1 | 3/2009 | Carnevali | 220/711 |
| 2009/0294460 A1 * | 12/2009 | Hovsepian | B65D 43/0212 220/713 |
| 2009/0308882 A1 * | 12/2009 | Hundley | B65D 47/2031 220/712 |
| 2011/0139667 A1 | 6/2011 | Burgess | 206/515 |
| 2011/0139800 A1 | 6/2011 | Urban | 206/713 |

\* cited by examiner

ANTI-SPILL DISPOSABLE DRINK THROUGH CUP LID

REFERENCE TO CO-PENDING APPLICATIONS

This application is a continuation-in-part of U.S. patent application Ser. No. 15/345,010 entitled "Anti-Spill Disposable drink through cup lid" filed on Nov. 7, 2016 and issued on Nov. 19, 2019 as U.S. Pat. No. 10,477,996, a continuation-in-part of U.S. patent application Ser. No. 13/368,654 entitled "Anti-Spill Disposable drink through cup lid" filed on Feb. 8, 2012, the contents of which are herein all incorporated by reference.

BACKGROUND

It is an object of the present invention to provide a beverage cup lid which overcomes the disadvantages of the previously known closures. Many prior art covers use openings on the tops of the lids in order to allow drinking of the beverage either by lips or by straw. Drinking flaps, releasable flaps, hinged openings and other configurations address the spillage issues, but the prior art does not eliminate the spillage. There is a need for an effective drink-through lid.

More than ever, beverages are consumed "on the go." Although the mobile beverage consumption conveniences are many, the spillage associated with using disposable beverage cups and drink-through disposable lids continue to negatively impact the overall consumer experience. Beverage vendors and consumers are at risk from the moment the beverage is poured into the beverage cup to the time the consumer disposes of the beverage cup and the drink-through lid. With the previously know closures, spillage can happen when the beverage cup is accidentally jostled, bumped or tipped.

In fact, many consumers continue to multitask while they hold and drink their beverages. Often, the beverage cup and the beverage become real distractions and expose the consumer to dangerous situations. Many beverages are consumed in a car during work commutes. Consumers are creative and use knees, crotches, hands and cup holders to hold their beverage cups during the drive. For example, while driving along a poorly paved road and drinking her morning coffee from a disposable coffee cup, a consumer drives over a deep pothole. Just finishing a sip, the pothole causes the consumer to jerk the beverage cup. The action causes coffee to spill on her new white blouse. Blotting the blouse with a napkin, she takes her eyes off of the road, hits 40 the curb with her front tire and suffers a tire blowout. Unfortunately, similar accidents happen frequently with far greater negative consequences.

Previously known lids are varied and attempt to solve the spillage issues associated with moving beverages in a disposable cup. Numerous attempts have been made to solve the spilling problem by providing lids which remain in place while drinking Some such lids are provided with many small holes through which the beverage may be consumed, the idea being if the cup is accidentally jostled, bumped or tipped with such a drink-through lid, there will be at least a limiting of the amount of liquid spilled. Other lids have been designed with depressible flaps, tear out flaps and other arrangements designed to serve the same purpose. While such lids to provide a certain amount of limitation of the spillage, the presence of holes in the lid and other flap related gaps nevertheless permits an unacceptable amount of spillage in the event that beverage cup is accidentally jostled, bumped or tipped. Because the beverage cup lids to date are unable to stop spillage, many beverage vendors and consumers seem to accept the fact that spillage is just an inherent aspect of the disposable beverage cup drinking experience. Internet blogs and other communication channels highlight the issues associated with beverage consumption "on the go," disposable beverage cups and drink-through lids. Ruined neckties and silk blouses, soaked automobile seats and cup holders and burned fingers, crotches and knees are all casualties of the previously known drink-through lids.

U.S. Patent Publication 2009/0308882 issued to Hundley is directed to a "Straw-Receptive Drink-Through Cup Lid." Hundley allegedly discloses a lit with "a central cover portion and a raised spout portion extending from the central cover portion. The raised spout portion may define a drinking opening therethrough. The drinking opening may have a circular perimeter. The raised spout portion may be adapted to allow liquid to flow through the drinking opening in response to a sucking force applied to the raised spout portion, and to receive a drinking straw through the drinking opening."

U.S. Pat. No. 5,409,131 issued to Phillips is directed to a "Coffee Lid." Phillips allegedly discloses "a disposable coffee cup having an open top comprising a dome shaped cover having an air vent hole and conforming to the open top of the coffee cup. A peripheral rim is on the cover to engage in a seating manner, a lip on the open top of the coffee cup."

U.S. Pat. No. 3,048,317 issued to Cochrane is direct to a "Closure cap for cups and like containers." Cochrane allegedly discloses "a closure cap for cups and like containers comprising a disc of resilient thermoplastic material, and dependent flange at the periphery of said disc for securing the cap to the container, a dependent tuber firmed in said disc and a hinged flap closing of the lower end of the dependent tube."

U.S. Pat. No. 4,441,640 issued to Lottick is directed to a "Non-spillable drinking container." Lottick allegedly discloses "A non-spillable drinking container is comprised of a resiliently flexible material with a drinking tube or straw sealably mounted therethrough. The drinking tube or straw is moveable toward and away from the bottom of the container. The lower end of the drinking tube is provided with an elastic diaphragm connected to the bottom of the container. Tension on the drinking tube away from the bottom of the container causes the lower end of the tube to be lifted away from the bottom and perforations in the diaphragm to be stretched open to allow fluid flow through the perforations in the diaphragm and out through the drinking tube."

U.S. Pat. No. 7,591,393 issued to Crudgington is directed to a "Disposable drinking cup lid." Crudgington allegedly discloses a "disposable drink-through dome lid for disposable drinking cups used in the sale of hot or cold beverages. In order to extend the volume within the cup, the top surface of the lid is elevated above the top surface of the beverage cup when in place, and is encompassed by an annular ridge that includes a generally oval-shaped opening for drinking."

U.S. Pat. No. 5,381,924 issued to Kiefel is directed to a "Non-spill drinking vessel." Kiefel allegedly discloses "a reuseable non-spill drinking vessel is adapted to be used with a straw. The drinking vessel comprises an open-top container for holding a liquid and a removable lid which is configured to fit over the open-top container to effectively contain liquid therein. The lid has an orifice for receiving a straw and further the orifice has a sealing means which sealingly encompasses the straw in a liquid-tight manner."

U.S. Pat. No. 6,948,633 issued to Freek is directed to a "Cup lid having combined straw slot depression and tear back lid retainer." Freek allegedly discloses a "drink-thru lid for a drinking cup including an annular mounting portion for sealingly engaging the drinking cup, wherein the annular mounting portion includes a downwardly extending annular skirt. The lid further includes a tear-back section extending from the annular skirt to a hinge portion located in a medial portion of the lid. The tear-back section includes a raised protrusion extending outwardly from an upper surface of the lid."

U.S. Pat. No. 3,384,265 issued to Frank is directed to a "Container Lid." Frank allegedly discloses "a container lid of the type applied to a generally circular container which is larger at the top than at the bottom and which with the lid applied is adapted to have a similar container stacked atop it. [The] lid has improved means to position generally centrally of the lid the bottom of a container stacked atop it and improved means for venting the container to which the lid is applied while obviating sloshing of liquid out through the vent."

U.S. Patent Publication 2007/0034629 by Mazzarolo is directed to a "Method of manufacturing thermoformed plastic articles and drink cup lid made by such method." M Mazzarolo allegedly discloses a "method and apparatus for vacuum thermoforming disposable drink cups lids including the step of imparting printing to the lids in two or more colors while they are in contact with the vacuum thermo-forming platen."

U.S. Patent Publication No. 2011/0139667 by Burgress is directed to a "Stackable Suction Canister and Lid Assembly." Burgress allegedly discloses a "stackable lid and corresponding fluid collection canister . . . . The stackable lid has a lid member that defines a first partial lid interior portion and a second partial lid interior portion. One or more ports are disposed on the first partial lid interior portion, with a filter engagement extension extending beneath one of the ports. A stacking recess is disposed on the second partial lid interior portion, and can be out of phase relative to the filter engagement extension."

U.S. Pat. No. 4,767,019 issued to Homer is directed to "Splash resistant cup lid." Homer allegedly discloses a "spill resistant lid having a rim structure adapted to engage a lip around the mouth of a drinking container in a substantially leak proof manner comprising a canopy suspended from the rim structure forming a shallow reservoir sized to fit into the mouth of the container and a vertical opening in the canopy which deflects fluid from splashing but which permits metered flow of beverage for convenient consumption."

Through-slits of a perforated straw aperture are common the through-slits' function is limited. Often, the straw is not strong enough to break through the perforated straw aperture and the straw can break or crack. Many perforated straw apertures are so strong that it takes two hands to create an appropriate straw opening. During this process, fingers are often exposed to the liquid and can cause skin burns, spillage or both. If the consumer does not want to use a finger to open the perforated straw aperture, a ballpoint pen or other like device can be used to puncture the perforated straw aperture. As with the fingers, the ballpoint pens are often exposed to the liquid creating messes and unnecessary distractions. Both scenarios negatively impact the overall user experiences for the thirsty consumer.

SUMMARY OF THE INVENTION

The present invention supports a drink-though lid that eliminates the need for plastic devices that plug the sipping holes. These plastic plugs are provided by coffee and tea houses at no cost to the consumers. However, these plastic plugs are expensive and serve only one purpose. These plastic plugs simply plug the sipping holes. When the consumer wants to drink the beverage, the plastic plug must be removed and placed to the side. If desired, the consumer can place the plastic plug back into the sipping hole after each sip or series of sips. This process is impractical and a distraction when the consumer is multitasking (walking, driving a car, etc.) and "on the go."

It is a further object of this invention that it is an economical design which can be produced on a mass basis and which permits drinking of the beverage through the lid while eliminating or effectively limiting the amount of beverage spillage in the event the beverage cup is upset, jostled or otherwise moved.

The present invention includes the following advantages:
1. Now coffee, tea and other beverages are truly mobile. Since the invention eliminates on-the-go beverage spills, commuters, walkers and other movers and shakers can finally drink with confidence.
2. Dentists recommend the present invention for their patients who drink coffee and tea. The invention protects teeth from damaging tannic acids and unattractive stains.
3. The present invention protects neckties, blouses, car beverage holders and other valuables from damaging coffee spills.
4. The present invention eliminates finger, hand, face and other bodily hot beverage burns.
5. The present invention educes spill distractions and creates safer and more relaxed drinking environments.
6. The present invention is environmentally friendly, recyclable and toxic free.
7. The present invention improves market share by retaining existing customers and attracting new ones.
8. The present invention reduces legal liability and exposure. During discovery, McDonald's was required to produce corporate documents of similar cases. Individuals in the industry may recall a customer bought coffee at a McDonald's drive-through, spilled it on herself, and suffered minor burns. She sued McDonald's and won. At the time of this trial, more than 700 claims had been made against McDonald's, and many of the victims had suffered third-degree burns.

The present invention relates to anti-spill disposable drink-through lids for hot and cold beverage cups. The present invention is directed to drink-through lids which may be placed over and attached to a disposable beverage cup and which provides a drink through opening near the perimeter of the lid's top surface for easy drinking The drink though lid can accommodate a consumer's lips or a beverage straw. When used with a straw, the lid and straw combination creates a spill-proof seal.

BRIEF DESCRIPTION OF THE DRAWINGS

FIG. 1a is a top view, FIG. 1b is a side view, FIG. 1c is a cross-section view taken along line 1c-1c of FIG. 1a, and FIG. 1d is a perspective view.

DETAILED DESCRIPTION OF THE INVENTION

Figure 1A:
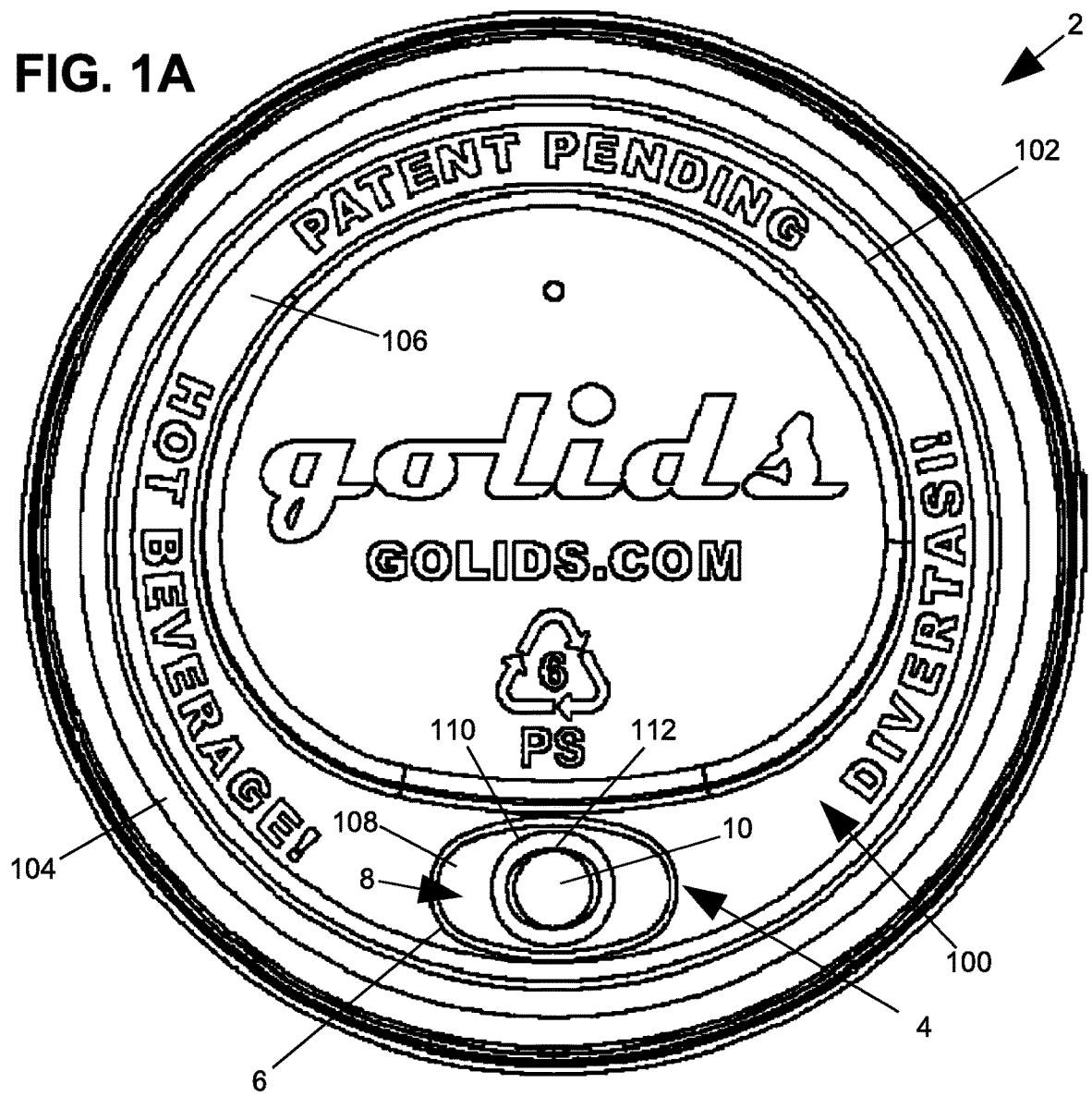
FIGS. 1a, 1b, 1c, and 1d illustrate the anti-spill disposable drink-through cup lid CAD drawing.
Figure 1B:
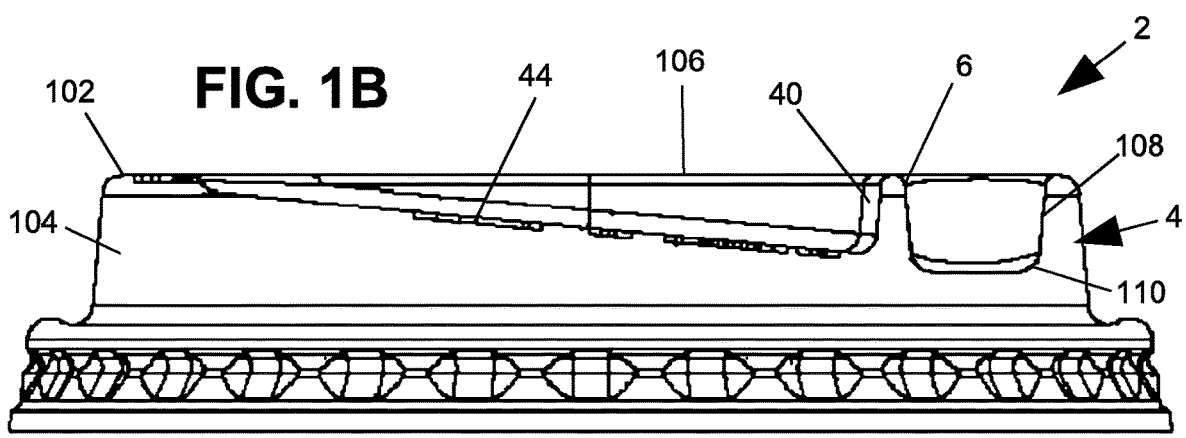
Figure 1C:
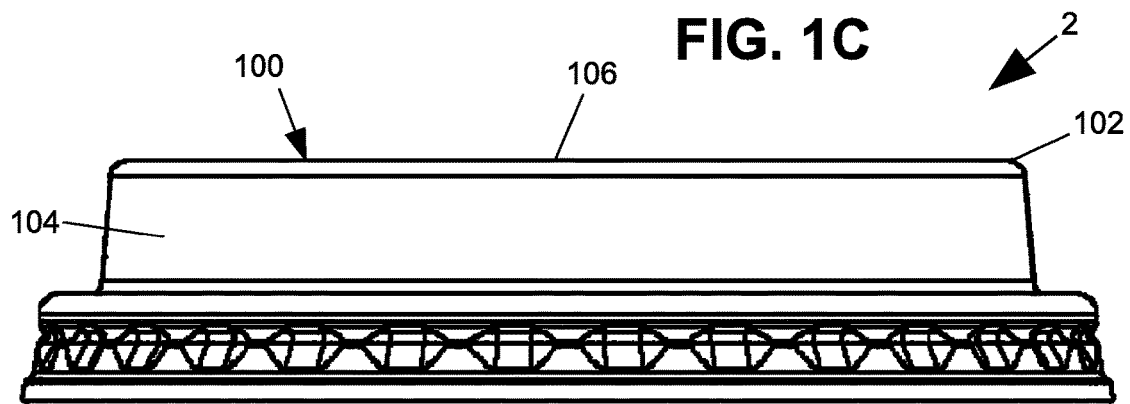

The present invention relates to an anti-spill disposable drink-through lid for hot and cold beverages. The anti-spill disposable drink-though lid 2, as shown in FIGS. 1a, 1b, 1c, and 1d includes an integrated and fixed spout 4 that consumers can use to drink hot or cold beverages. The integrated spout 4 includes (i) a spout opening 6 (preferably oval-shaped, 0.63 inches on the short axis, 1.07 inches on the long axis, as shown in FIG. 1a), (ii) an unperforated inverted conical structure 8 (preferably extending from the opening 6 to the hole 10 at a depth of 0.3 inches of a total lid height of 0.8 inches, as shown in FIGS. 1a, 1b, 1c, and 1d) and (iii) an opening 10 (preferably round with a diameter of 0.266 inches, as shown in FIGS. 1a and 1c) at the bottom of the inverted conical structure 8. This integrated spout 4 enables the consumer to use the integrated spout with or without a straw. The oval spout opening 6 is designed to comfortably fit consumer lips. The spout opening 6 can be configured in many shapes (round, oval, etc.). The oval spout opening 6 is located in a raised top 100 of the drink lid with an outer circumference 102 that fully extends around the drink lid 2. An outer wall 104 extends down from the outer circumference 102 and has a height of at least 0.3 inches. The raised top 100 also has a flat surface 106 that extends from directly adjacent a side of the oval spout opening 6, around the lid 2, and back to an opposite side of the oval spout opening 2. The inverted conical structure 8 has an oval portion 108 and a curved portion with a spheroidal curvature or toroidal curvature 110 extending down to a continuous circular edge 112. The curved portion with a spheroidal curvature or toroidal curvature 110 has a radius of curvature of 0.063 inches. The flat surface 106 is bound by a circular outer edge 138. The outer edge 138 forms a geometric circle in that it forms a circle that can be contained within a single geometric plane.

Figure 3:
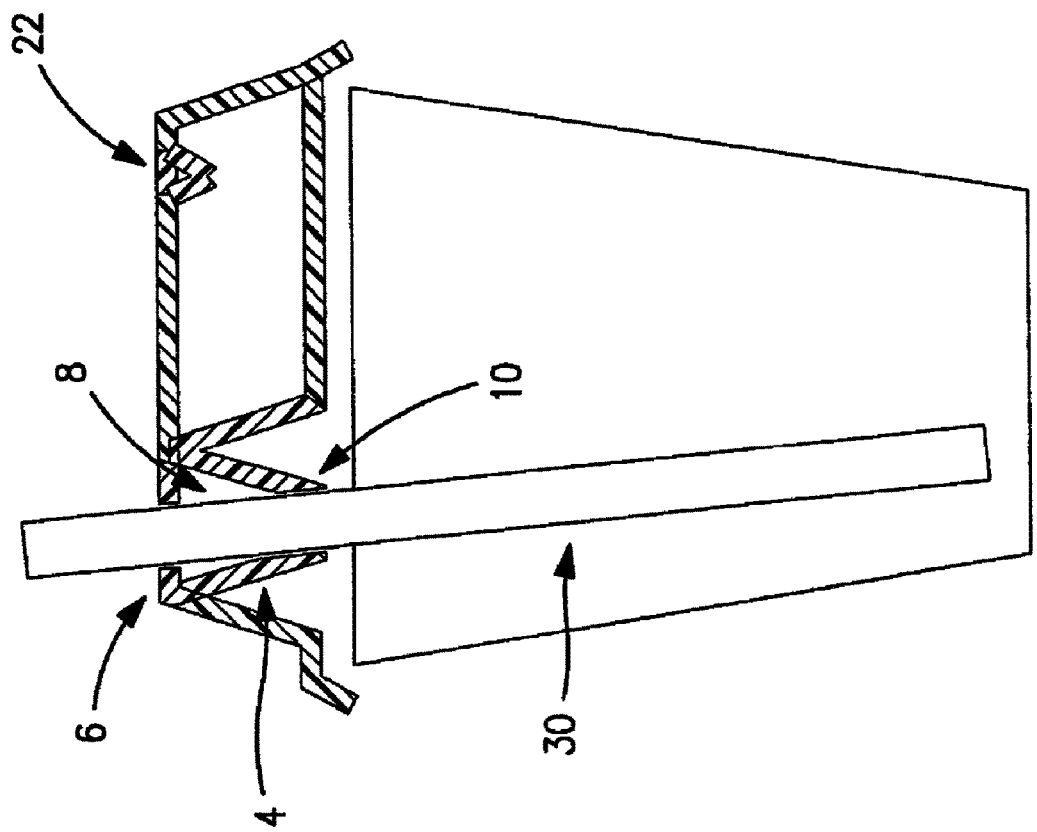
FIG. 3 illustrates a schematic cross-section of the anti-spill disposable drink-through cup lid and a disposable beverage cup. This drawing does include a straw.
Figure 2:
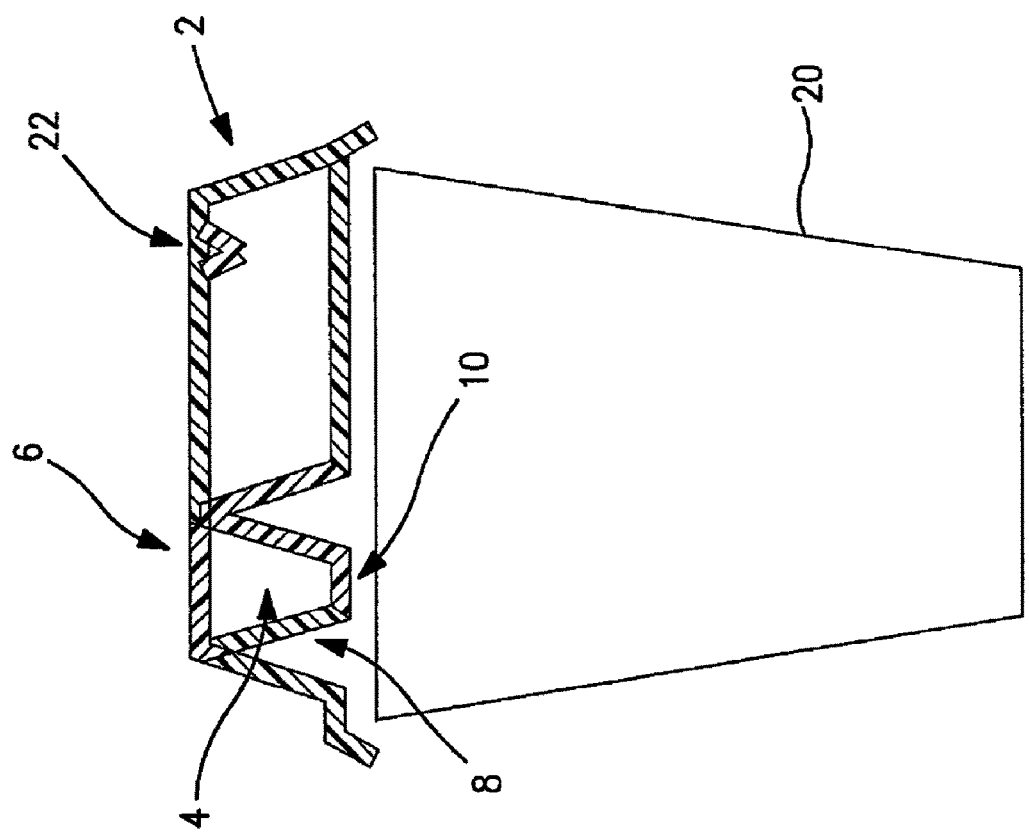
FIG. 2 illustrates a schematic cross-section of the anti-spill disposable drink-through cup lid and a disposable beverage cup. This drawing does not include a straw.

FIG. 2 illustrates a schematic cross-section of the anti-spill disposable drink-through cup lid 2 and a disposable beverage cup 20. This drawing does not include a straw. FIG. 3 illustrates a schematic cross-section of the anti-spill disposable drink-through cup lid 2 and a disposable beverage cup 20. This drawing does include a straw 30. Since the spout opening 6 is larger than the opening 10 at the bottom of inverted conical structure 8, the spout opening 6 provides the beverage server or consumer with a generous guide for the straw insertion. The opening 10 is preferably round in shape.

The opening 10 diameter is preferably the exact same size or slightly smaller than the drinking straw 30 diameter depending on the lid and straw materials, composition and other factors. This opening 10 and straw 30 relationship is important. It is this relationship between the opening 10 and the straw 30 which creates a snug and anti-spill seal. The fit between the opening 10 and the straw 30 is like "a hand and glove." Once the straw 30 is placed within the spout opening 6, the beverage server or consumer simply pushes the straw down the inverted conical structure 8 and through the opening 10 at the bottom of the inverted conical structure 8. Unlike other inventions, this invention's straw insertion process can easily be done with just one hand. Beverage servers and consumers appreciate the simple, quick, convenient and efficient straw insertion process. In addition, the risk of damaging the straw 30 or the integrated spout 4 during the process is minimal. Although straws with smaller diameters than the opening 10 diameter are possible, the ability to eliminate spills is compromised if smaller diameter straws are used. Smaller straws are unable to create a snug seal.

If the consumer requires cream, sugar or other condiment for the beverage, the lid 2 can easily be removed allowing the consumer to add the condiments. As with many lids, the lid 2 can be easily replaced once the condiments have been added. If the consumer is using a straw 30, it is important to highlight that the straw and lid remain together during the removal and replacement processes. It is the "hand and glove" fit which keeps the two items united.

It is a primary objective of the present invention to overcome the disadvantages of the prior art and provide a spout 4 that dramatically reduces lid spillage. This is accomplished by adding the inverted conical structure 8 to the integrated spout 4. The inverted conical structure 8 extends from the top of the integrated spout 4 downward and into the integrated spout 4. Although consumers can enjoy beverages without straws, the open cone 8 easily allows beverage servers or consumers to guide a straw 30 through the top of the integrated spout 4, through the spout opening 6, down into the inverted conical structure 8 and through the opening 10 at the bottom of the inverted conical structure 8. It is important to note that the opening 10 is designed to be the exact same size or slightly smaller than the diameter of the straw 30 so that when the straw 30 is inserted, the opening 10 and the straw 30 create a snug and leak-proof seal. The advantages of this design include a dramatic reduction and even elimination of beverage spillage.

The present invention is a vast improvement to Freek's disclosure (U.S. Pat. No. 6,948,633) of two flaps and Crudgington's disclosure (U.S. Pat. No. 7,591,393 B2) which calls for "four flaps served to stabilize and partially seal the inserted drinking straw within drink-through opening regardless of the diameter of the drinking straw being used." As written in Crudgington's description, the four flaps do not create a leak-proof seal. The partial seal is compromised and prone to spillage and drips. In addition, when Crudgington's four flaps are exposed to hot beverages, the four flaps become weak and compromised leaving a less-than-stabilized straw. Regardless of the number of flaps (two or four), the partial seals allow spillage and leaks. Even if the present invention is used without a straw, the conical opening and inverted conical structure obstruct the beverage from traveling up through the conical opening and the inverted conical structure and out onto the lid, the surrounding environment or the beverage server and consumer.

The disposable drink-through lid according to the present invention may be configured so that the lid extends upward (as shown in FIGS. 2 and 3) the volume of the cup it covers.

This is desirable when beverages are served with whipped cream, foam and other toppings.

Figure 4:
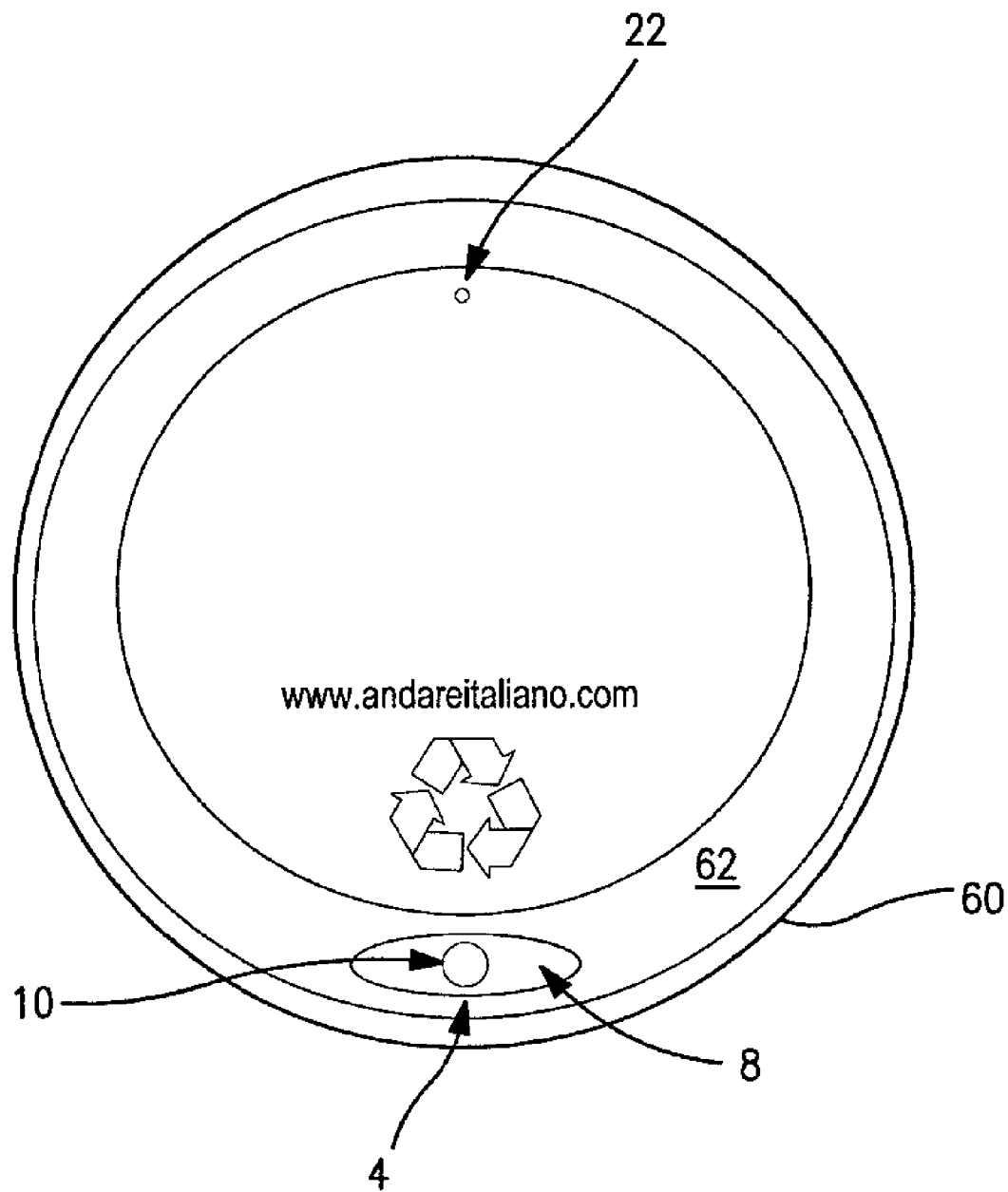
FIG. 4 illustrates a top view of the anti-spill disposable drink-through cup lid. This drawing does not include a straw.

FIG. 4 illustrates a top view of the anti-spill disposable drink-through cup lid. This drawing does not include a straw. A small vent hole 22 can be positioned on the lid surface directly across from the conical structure 8. This small vent hole 22 can be similar in structure to the inverted conical structure 8 but at a much smaller scale, or a standard vent hole commonly known in the art. This design limits any spillage from the vent hole 22.

The stacking capability of the drink-through lids 2 of the present invention is very important. The space-saving nesting feature is a beverage industry requirement due to the large quantities of lids fast food restaurants, coffee houses and other like establishments must stock. In addition, this same space-saving nesting feature is appreciated at the point of use as beverage servers typically work in small and congested areas. The nesting quality reduces the cost of shipping from the drink-through lid manufacturer to the restaurant, coffee house or other establishment.

Configuration options of the present invention include removable tabs that can easily be removed by the beverage vendor or consumer using fingers for the spout opening tab or a straw for the conical opening tab. While the spout opening tab can be disposed of, the conical opening tab is designed to allow the straw to penetrate the conical opening and form a snug seal, the conical opening tab remains attached to the inverted conical structure so that the tab is not accidentally swallowed by the consumer. Although optional, most beverage vendors will not order straws with protective paper wrappers since the beverage server will likely insert the straw into the drink-though lid in a controlled and sanitary beverage pouring environment. Having the beverage server insert the straw makes the invention's drink-through lid virtually leak proof. This straw wrapper elimination decreases the overall straw costs and is a more environmentally aware product.

Figure 5A:
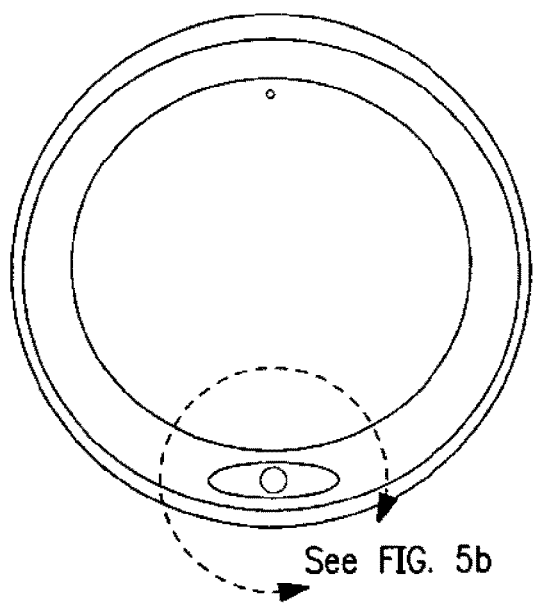
FIGS. 5a and 5b illustrate, respectively, a top view and a detailed side view of the integrated spout.
Figure 5B:
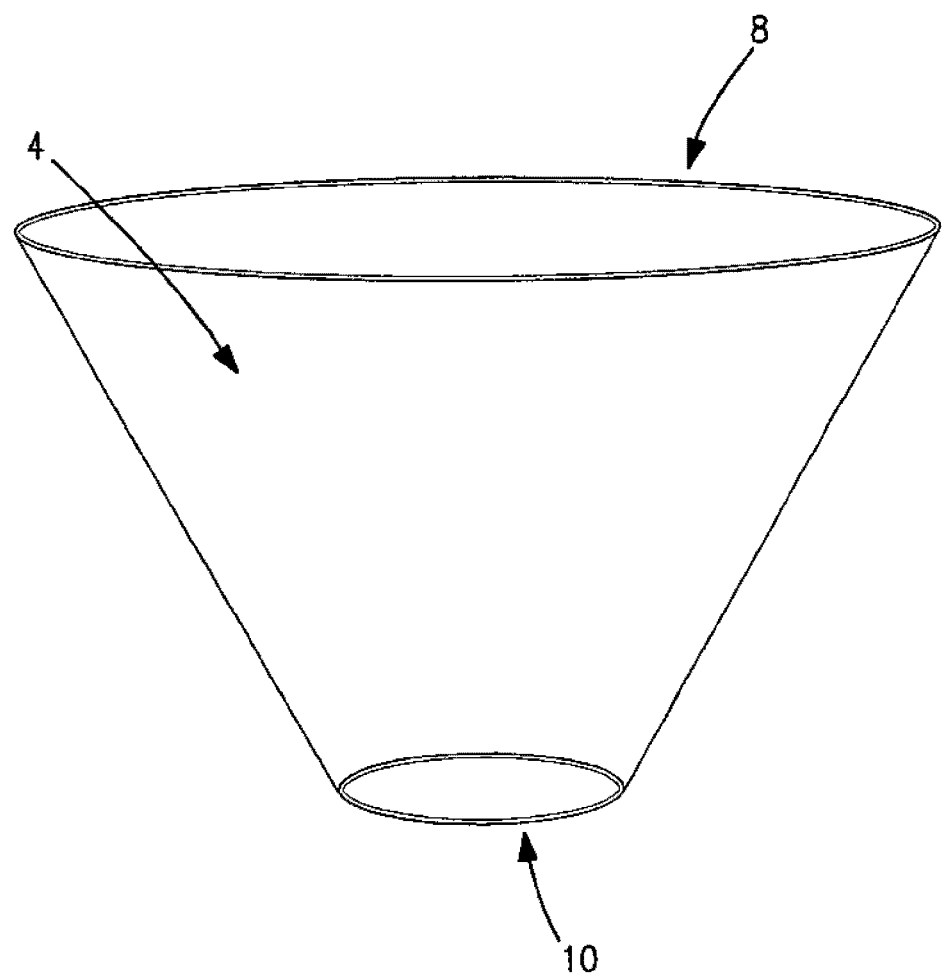

FIGS. 5a and 5b illustrate, respectively, a top view and a detailed side view of the integrated spout 4, showing the conical structure 8 and the opening 10. Unlike drink-though lids offered today, this invention provides spillage and leakage protection at the time the drink-though lid 2 is engaged with the cup 20. The drink-though lids provide a new level of protection from spillage and leakage. If a straw 30 is combined with the drink-though lid 2, the risk of spillage and leakage is eliminated. For greater protection, a straw 30 can be inserted for a virtually leak-proof drink-through lid 2. This can reduce legal exposure for the beverage vendor and provide a safer environment for the beverage server and the consumer.

Figure 1D:
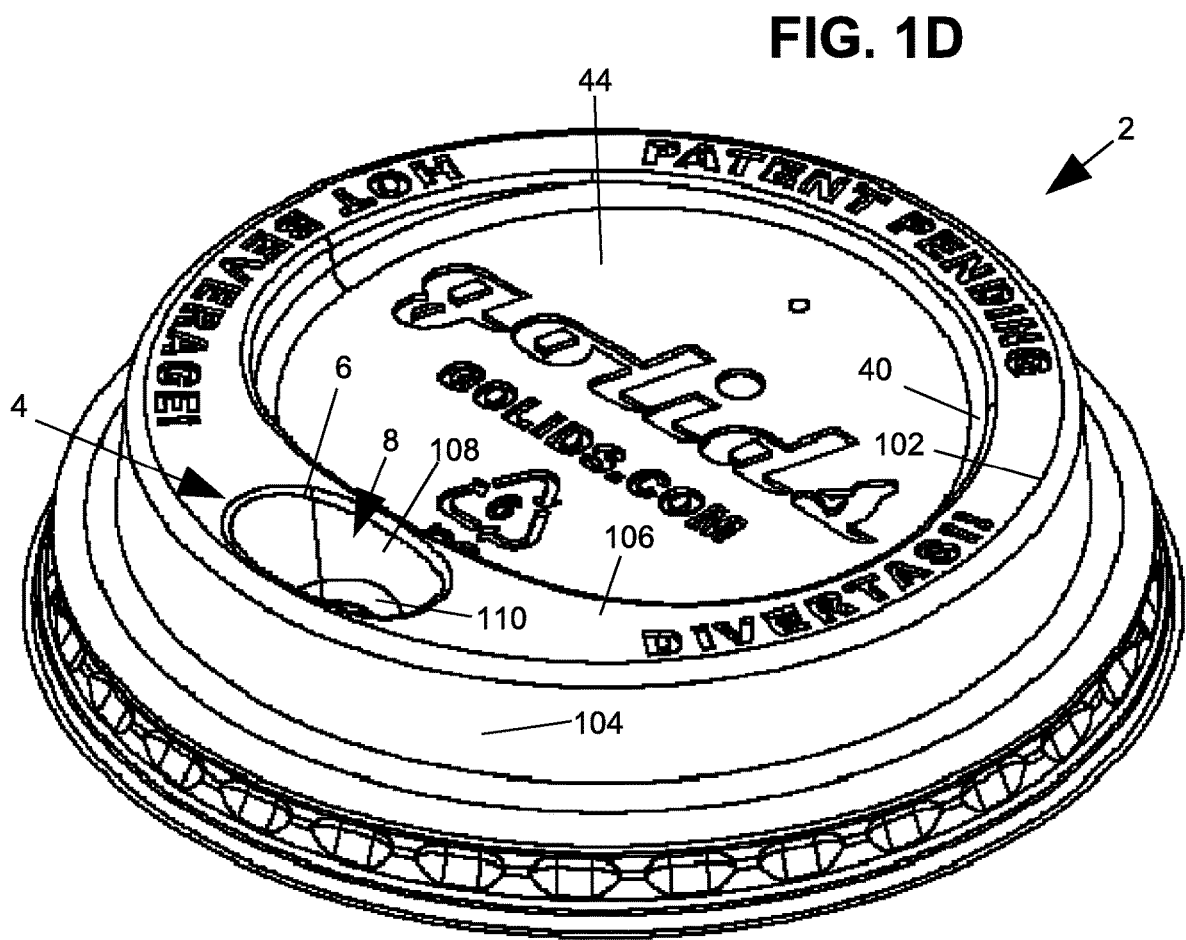

As shown in FIGS. 1c and 1d, the drink-though lid configuration can include an elevated rim 40 surrounding a depression 44 around at least a portion of the surface of the lid 2 to contain any spillage. As shown in FIGS. 1c and 1d, the depression 44 may be angled to one side of the lid 2. The drink-though lid 2 can include beverage punches (embossments) that can identify the kind of beverage (coffee, decaffeinated, cream, etc.). The drink-though lid and straw can include advertisements or other content.

Figure 6:
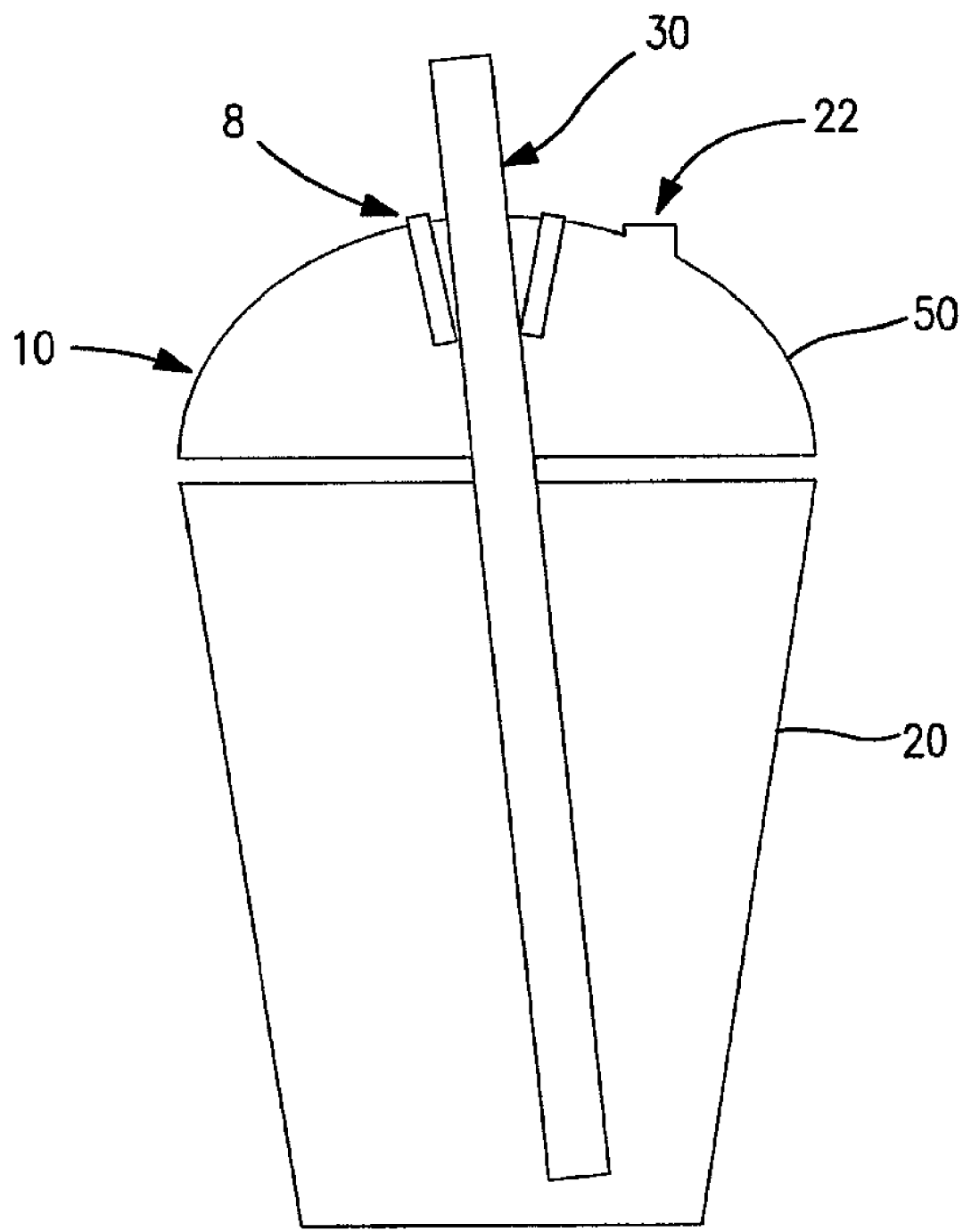
FIG. 6 illustrates a schematic cross-section of the anti-spill disposable drink-through cup dome lid and a disposable beverage cup. This drawing does include a straw. This configuration is typically used for a cold beverage.

The present invention can also be incorporated into a dome drink-through lid, as shown in FIG. 6, where the cup 20 has a dome lid 50 having a vent hole 22, the conical structure 8, with the straw 30 extending through the opening 10. Unlike the current dome lid configurations, this invention provides significant advantages including a fully sealed beverage. Current dome lids include a large opening on the top of the lid which allows whipped cream, beverage toppings and liquid to spill and create a mess on the exterior of the dome lid, the beverage server hands, the consumer hands and the surrounding area. The invention can also be incorporated into a flat drink-through lid. Unlike current flat drink lids, the invention can include a short inverted conical structure with a conical opening. As with the other embodiments, the key to the design is the snug fit between the conical opening and the straw. It is this "hand and glove" fit which eliminates beverage spillage.

The present invention thus relates to anti-spill disposable drink-through lids. The invention can be used for hot and cold beverages and their related disposable cups. The present invention also relates to a drink-through lid which may be placed over and attached to a disposable beverage cup 20 and which provides a drink-through opening near the perimeter 60 (FIG. 4) of the lid's top surface 62 for easy drinking the drink-though lid 2 thus accommodates a consumer's lips or a beverage straw. The anti-spill disposable drink-though lid 2 includes an integrated and fixed spout 4 that consumers can use to drink hot or cold beverages. The integrated spout 4 includes a spout opening 6, an inverted conical structure 8 and an opening 10 at the bottom of the inverted conical structure 8. The opening 10 is preferably round in shape. This integrated spout 4 enables the consumer to use the integrated spout with or without a straw. The spout opening 6 is designed to comfortably fit consumer lips. The spout opening 6 can be configured in many shapes (round, oval, etc.). Since the spout opening 6 is larger than the opening 10 at the bottom of inverted conical structure 8, the spout opening 6 provides the beverage server or consumer with a generous guide for the straw insertion.

The opening 10 diameter is the exact same size or slightly smaller than the drinking straw 30 diameter depending on the lid and straw materials, composition and other factors. This conical opening 10 and straw 30 relationship is important. It is this relationship between the opening and the straw which creates a snug and anti-spill seal. The fit between the opening and the straw is like "a hand and glove." Straws with smaller diameters than the opening 10 diameter are possible, but the ability to eliminate spills may be compromised if smaller diameter straws are used. Once the straw 30 is placed within the spout 4 opening 6, the beverage server or consumer simply pushes the straw down the inverted conical structure and through the conical opening at the bottom of the inverted conical structure. Unlike other inventions, this invention's straw insertion process can easily be done with just one hand. A small vent hole 22 can be positioned on the lid surface directly across from the conical structure 8.

Figure 7:
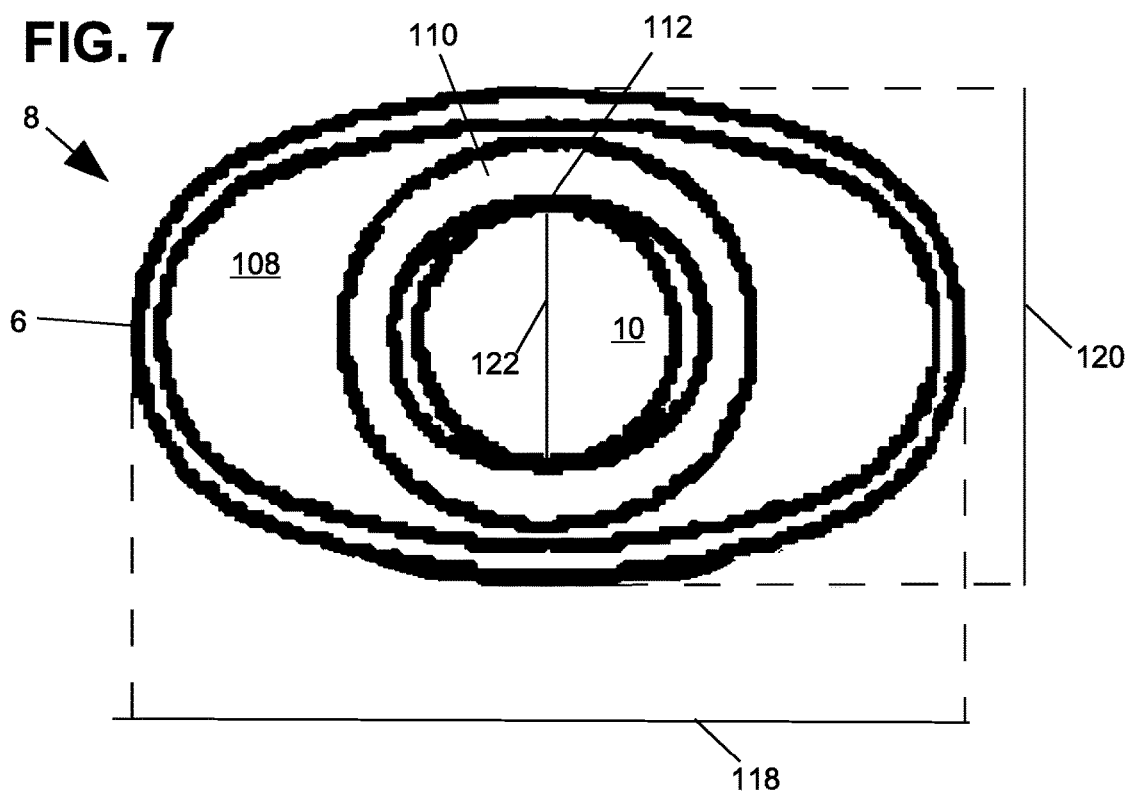
FIG. 7 is cropped view of FIG. 1 highlighting various features of the conical spout.

As shown in FIG. 7, the conical structure 8 has a sidewall with an oval portion 108 that transitions to a curved portion with a spheroidal curvature or toroidal curvature 110 that extends to the continuous circular edge 112. The oval portion 108 extends from the oval spout opening 6 to the toroidal portion. In the illustrated example, the oval spout opening has a length 118 of 1.07 inches and a width 120 of 0.63 inches, such that the length 118 is about two thirds larger than the width 120. The opening 10 has a first diameter 122 that is 0.266 inches and the toroidal portion has a toroidally curved surface with a radius of curvature of 0.063 inches such that the total diameter of the curved portion with a spheroidal curvature or toroidal curvature 110 is 0.392 inches, or 50% larger than the first diameter 122 of the opening, 40% smaller than the width 120, or 60% smaller than the length 118. The opening with a first diameter 122 is structured to receive a straw (not shown) having a second diameter that is less than or equal to the first diameter 122.

Figure 8:
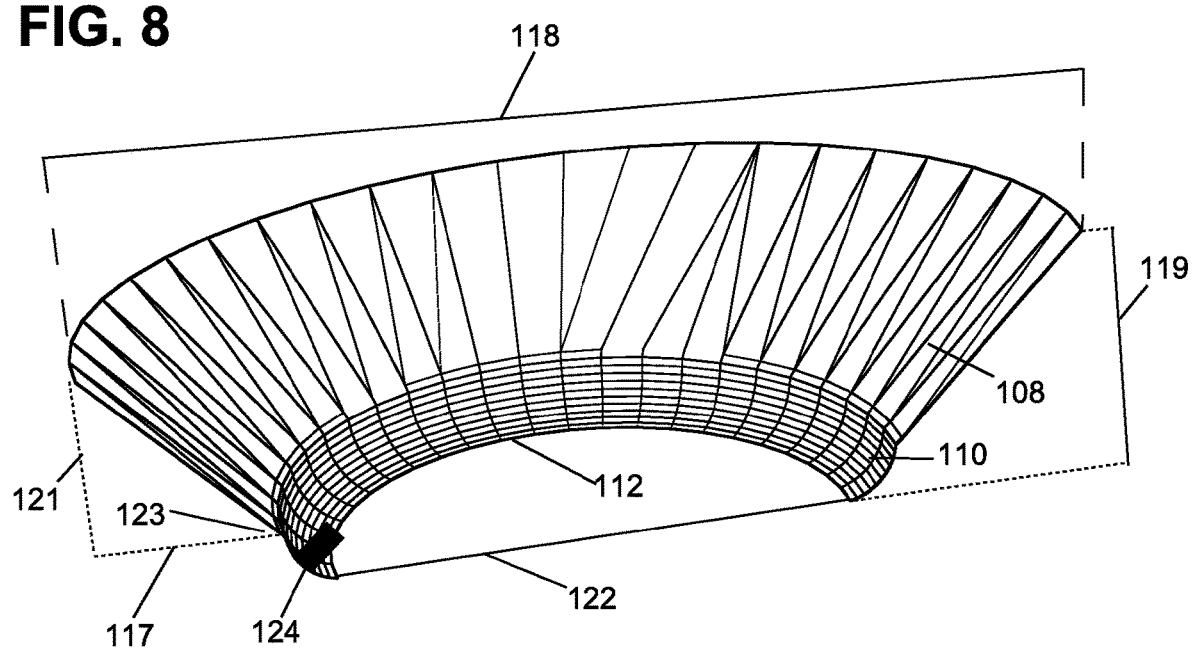
FIG. 8 is a three-dimensional rendering of a sectional view of the conical spout shown in FIG. 7.

FIG. 8 show a three-dimensional view of a sectional view of conical structure 8 shown in FIG. 7. The oval portion 108 extends down to a spheroidal portion 110 with a radius 124 of curvature. The continuous circular edge 112 extends fully around the opening and does not include any perforations or grooves configured to allow a portion of the conical structure to deflect away from a straw when inserted into the opening 10. The length 118 in the illustrated example of FIG. 8 is 1.07, the diameter 122 is 0.266, and the radius of curvature is 0.063 inches such that the run 117 of the oval portion 108 is 0.34 inches ((1.07/2-0.266/2-0.063). The radius of curvature is about a fifth the total height 119 of the conical structure 8. The radius of curvature is about a quarter the diameter 122. The total height 119 of the conical structure 8 is 0.300 inches, and the radius 124 of curvature is 0.063 such that the rise 121 of the oval portion 108 is 0.237 inches. The total height 119 of the conical structure 8 is within 15% of the diameter 122. (0.266 inches vs. 0.300 inches). With a rise 121 of 0.237 inches and a run 117 of 0.34 inches, the slope 123 of the oval portion is at least 35 degrees. Along the bisecting width 120 of the oval opening (the width line that bisects the oval opening), the slope of the oval portion 108 is approximately 90 degrees (almost vertical) while along the bisecting length 118 of the oval opening the slope of the oval is 35 degrees. In the illustrated example, the minimum slope of the oval portion 108 is less than half, but more than a third, the maximum slope of the oval portion 108. That is, the 35 degrees at a minimum is less than half 90 degrees, but more than a third of 90 degrees.

Figure 9:
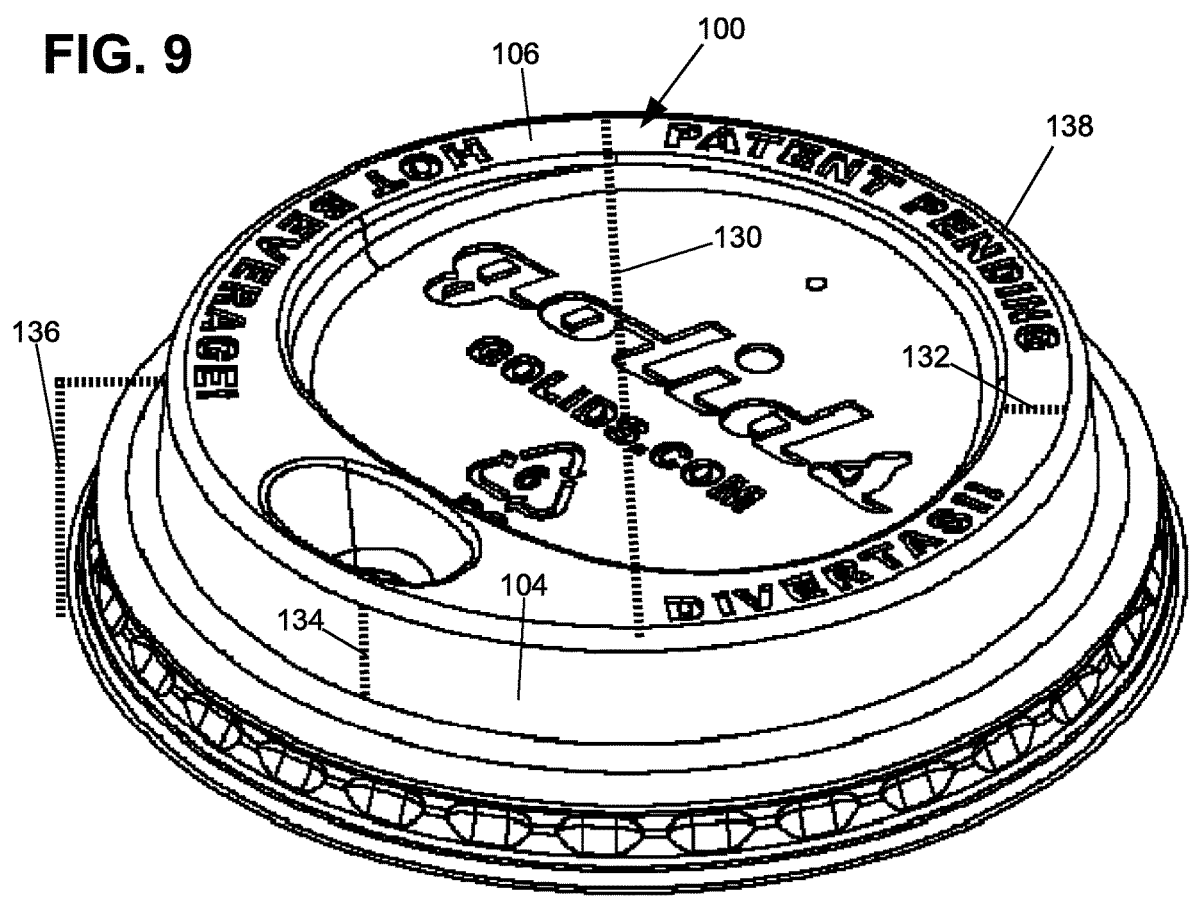
FIG. 9 shows an annotated version of FIG. 1D with additional measurements.

FIG. 9 shows an annotated version of FIG. 1D with additional measurements. The raised top 100 has a diameter 130 of 2.74 inches such that the diameter 130 of the raised top is approximately 80% of the total diameter of the lid (3.688 inches). The flat surface 106 of the raised top 100 has a minimum width 132 that is approximately equal to diameter 10 of the opening (0.266 inches). The minimum width 132 is less than one half the width 120 of the oval.

The outer wall 104 has a height 134 (or wall height) of 0.45 inches, or at least 0.30 inches. In the illustrated example, the height 134 of the outer wall 104 is less than half the length 118 of the conical structure 8, larger than the diameter 122 of the opening 10, and a tenth the length of the total diameter of the lid.

The oval spout opening 6 is located in a raised top 100 of the drink lid with an outer circumference 102 that fully extends around the drink lid 2. An outer wall 104 extends down from the outer circumference 102 and has a height of at least 0.3 inches. The raised top 100 also has a flat surface 106 that extends from directly adjacent a side of the oval spout opening 6, around the lid 2, and back to an opposite side of the oval spout opening 2. The inverted conical structure 8 has an oval portion 108 and a curved portion with a spheroidal curvature or toroidal curvature 110 extending down to a continuous circular edge 112. The curved portion with a spheroidal curvature or toroidal curvature 110 has a radius of curvature of 0.063 inches.

In one embodiment, the height 134 of the outer wall is one half the length 118 of the oval spout opening. In another embodiment the first diameter 122 is less than half the width 120 of the oval opening, and a quarter the length 118 of the oval opening. The width 120 of the oval opening is about half the length 118 of the oval opening. The first diameter 122 is approximately equal to the height 134 of the outer wall. The total height 119 of the conical structure 8 is roughly equal to the first diameter 122. The height 119 is within 15% of the first diameter 122. The total height 119 of the conical structure 8 is half the width of the oval opening, and more than a quarter of the length 118 of the oval opening. The total height 136 of the lid is less than the length 118 of the oval opening, but more than the width 120 of the oval opening. The length 118 of the oval opening is more than one third the diameter 130 of the raised top, and less than one half the diameter 130 of the raised top.

The disposable drink-through lid may be configured so that the lid extends the volume of the cup it covers. This is desirable when beverages are served with whipped cream, foam and other toppings. The invention can easily be removed from the cup allowing the consumer to add condiments (cream, sugar, cinnamon, etc.). The lid can be easily replaced once the condiments have been added. The invention can also be manufactured to function with a dome drink-through lid 50 and/or a flat drink-through lid. The space-saving nesting feature is a beverage industry requirement due to the large quantities of lids fast food restaurants, coffee houses and other like establishments must stock. The space-saving nesting feature is appreciated at the point of use as beverage servers typically work in small and congested areas. The nesting quality reduces the cost of shipping from the drink-through lid manufacturer to the restaurant, coffee house or other establishment.

The use of terms such as "first" diameter and "second" diameter in this application does not specify a relationship between the two elements instead is instead used to designate two elements. The designators may be flipped, or otherwise changed, without changing the meaning of the terms.

The drink-though lid and straw can include advertisements or other content. The invention is an economical design which can be produced on a mass basis and which permits drinking of the beverage through the lid while eliminating or effectively limiting the amount of beverage spillage in the event the beverage cup is upset, jostled or otherwise moved.

The invention claimed is:
1. A straw-and-lid combination comprising:
    a straw having a first diameter; and
    a round lid having
        a raised top having a full circular circumference,
        an outer wall extending down from the full circular circumference of the raised top and having a wall height,
        an oval opening in the raised top located adjacent to the full circular circumference, the oval opening having an oval width and an oval length,
        the raised top having a flat surface extending from directly adjacent the oval opening, around the round lid adjacent to the full circular circumference, and back to the oval opening,
        an unperforated funnel structure extending downward from the oval opening in the raised top to a circular opening in the unperforated funnel structure, the circular opening having a second diameter that is smaller than or equal to the first diameter of the straw, and
        the unperforated funnel structure having
            a curved portion with a spheroidal curvature adjacent the circular opening and
            a side wall that extends from the oval opening to adjacent to the curved portion with a spheroidal curvature that are configured to guide the straw into the circular opening when the round straw is inserted into the oval opening; and wherein the second diameter of the circular opening is less than one half the oval width.

2. The straw-and-lid combination of claim 1 wherein
the side wall has a first slope along a major oval axis of the side wall,
the side wall has a second slope along a minor oval axis of the side wall,
the first slope is less than half the second slope, and
the first slope is more than a third the second slope.

3. The straw-and-lid combination of claim 1 wherein the wall height is one half the oval length.

4. The straw-and-lid combination of claim 1 wherein the unperforated funnel structure extends downward from the oval opening a first length, and the first length is within 15% of the second diameter.

5. The straw-and-lid combination of claim 1 wherein
the round lid has a total height, and
the total height is less than the oval length.

6. The straw-and-lid combination of claim 5 wherein the total height is more than the oval width.

7. The straw-and-lid combination of claim 1 wherein
the curved portion with a sphereidal portion has a radius of curvature, and the radius of curvature is a quarter the second diameter.

8. The straw-and-lid combination of claim 1 wherein
the unperforated funnel structure extends downward from the oval opening a first length,
the curved portion with a spheroidal curvature has a radius of curvature, and
the radius of curvature is a fifth of the first length.

9. The straw-and-lid combination of claim 1 wherein
the flat surface extending around the round lid has a minimum width equal to the second diameter.

10. The straw-and-lid combination of claim 1 wherein
the flat surface extending around the round lid has a minimum width less than one half the oval width.

11. The straw-and-lid combination of claim 1 wherein
the raised top has a circular edge about the full circular circumference, and the circular edge forms a geometric circle.

12. A straw-and-lid combination comprising:
a straw having a first diameter; and
a round lid having
a raised top having a full circular circumference,
an outer wall extending down from the full circular circumference of the raised top and having a wall height,
an oval opening in the raised top located adjacent to the full circular circumference, the oval opening having an oval width and an oval length,
the raised top having a flat surface extending from directly adjacent the oval opening, around the round lid adjacent to the full circular circumference, and back to the oval opening,
an unperforated funnel structure extending downward from the oval opening in the raised top to a circular opening in the funnel structure, the circular opening having a second diameter that is smaller than or equal to the first diameter of the straw, and
the funnel structure having
a curved portion adjacent the circular opening and
a side wall that extends from the oval opening to adjacent to the curved portion
that are configured to guide the straw into the circular opening when the round straw is inserted into the oval opening; and
wherein
the side wall has a first slope along a major oval axis of the side wall,
the side wall has a second slope along a minor oval axis of the side wall,
the first slope is less than half the second slope, and
the first slope is more than a third the second slope.

13. The straw-and-lid combination of claim 12 wherein
the curved portion has a radius of curvature, and
the radius of curvature is a quarter the second diameter.

14. The straw-and-lid combination of claim 12 wherein
the unperforated funnel structure extends downward from the oval opening a first length, and the first length is within 15% of the second diameter.

15. The straw-and-lid combination of claim 12 wherein
the flat surface extending around the round lid has a minimum width equal to the second diameter.

16. The straw-and-lid combination of claim 12 wherein
the wall height is one half the oval length.

17. A straw-and-lid combination comprising:
a straw having a first diameter; and
a round lid having
a raised top having a full circular circumference,
an outer wall extending down from the full circular circumference of the raised top and having a wall height,
an oval opening in the raised top located adjacent to the full circular circumference, the oval opening having an oval width and an oval length,
the raised top having a flat surface extending from directly adjacent the oval opening, around the round lid adjacent to the full circular circumference, and back to the oval opening,
an unperforated funnel structure extending downward from the oval opening in the raised top to a circular opening in the funnel structure, the circular opening having a second diameter that is smaller than or equal to the first diameter of the straw, and
the funnel structure having
a curved portion adjacent the circular opening and
a side wall that extends from the oval opening to a adjacent to the curved portion, and
that are configured to guide the straw into the circular opening when the round straw is inserted into the oval opening; and
wherein
the flat surface extending around the round lid has a minimum width less than one half the oval width.

18. The straw-and-lid combination of claim 17 wherein
the curved portion has a radius of curvature, and
the radius of curvature is a quarter the second diameter.

19. The straw-and-lid combination of claim 17 wherein
the unperforated funnel structure extends downward from the oval opening a first length, and the first length is within 15% of the second diameter.

20. The straw-and-lid combination of claim 17 wherein
the flat surface extending around the round lid has a minimum width equal to the second diameter.

* * * * *